Patented Oct. 21, 1947

2,429,531

UNITED STATES PATENT OFFICE 2,429,531

PROCESS FOR PRODUCING CALCIUM HYPOCHLORITE

Edward C. Soule, Niagara Falls, and Homer L. Robson, Lewiston, N. Y., assignors to The Mathieson Alkali Works, Inc., New York, N. Y., a corporation of Virginia No Drawing. Application February 18, 1944, Serial No. 522,970

8 Claims. (Cl. 23—86)

This invention relates to the manufacture of calcium hypochlorite and provides an improved method whereby calcium hypochlorite may be readily and economically produced in commercially practical and highly desirable forms. In general the process comprises the neutralization of hypochlorous acid with a basic calcium hypochlorite.

It has previously been proposed to prepare calcium hypochlorite by reacting chlorine monoxide with hydrated lime. However, operations based on such reaction have been found not only difficult to carry out and control but to result in a product low in hypochlorite and frequently containing 20% or more of unreacted lime.

A somewhat improved method has also been proposed whereby the chlorine monoxide is first dissolved in water to obtain a solution of hypochlorous acid and this acid solution subsequently neutralized by adding a slurry of lime and water. Under such conditions considerable quantities of chlorate are formed to the detriment of the product. The formation of the chlorate is usually attributed to the oxidation of the hypochlorite ion by the hypochlorous acid and in general occurs whenever both of these materials are present in substantial proportions. By maintaining an excess of lime, this acid condition is avoided and the formation of chlorates reduced. Nevertheless, this proposal has not been found commercially satisfactory.

The addition of hypochlorous acid to dry hydrated lime has also been proposed but has not been found feasible. The difficulty appears to be that although excess lime is present, it is not in solution and therefore an alkaline condition adequate to avoid the formation of the chlorate is not maintained. Also, it has not been found feasible to add hypochlorous acid and dry lime simultaneously to a previously prepared slurry. Such procedure has been found to result in a lumping of the lime and a low test hypochlorite product containing considerable quantities of unreacted lime.

In admixing lime and hypochlorous acid, it has been found necessary to take special precautions against the lumping of the lime as such lumping readily occurs due to the formation of a covering or crust of basic hypochlorite around the lime which prevents contact of the latter with the hypochlorous acid solution.

At least two basic calcium hypochlorite compounds are known, namely, the dibasic hypochlorite having the formula $Ca(OCl)_2 \cdot 2Ca(OH)_2$, and the hemibasic hypochlorite, having the formula $2Ca(OCl)_2 \cdot Ca(OH)_2$. Either or both of these basic compounds may be formed by reacting lime with hypochlorous acid. A layer of either or both of these compounds surrounding lumps or aggregates of lime forms an effective seal retarding the solution of the lime and prevents further reaction of the lime with the hypochlorous acid.

Where lime and hypochlorous acid have been admixed, it has been found necessary to prepare first, an aqueous paste or slurry of the lime free from lumps and to add the hypochlorous acid to the slurry slowly or in small increments. In order to obtain products suitably low in chlorates, the addition of the hypochlorous acid must be sufficiently slow that the aqueous phase of the slurry is alkaline at all times, that is, the rate of neutralization must be slower than the rate of solution of the lime. Even though such precautions be taken, it has been found unsatisfactory to prepare a slurry containing more than about 25% of calcium hypochlorite by the neutralization of lime paste with hypochlorous acid solutions.

By such neutralization of lime, the dibasic salt is formed which is in turn converted, to a greater or lesser extent, into the hemibasic salts by further neutralization. Usually some of the basic salt is present in the solid phase together with unreacted lime and under such conditions the neutralized salt does not crystallize well. Further the formation of the dibasic and hemibasic salts tends to thicken the slurry so that at about 30% calcium hypochlorite the slurry is too thick for rapid dispersion of the added hypochlorous acid and there results localized acidity which induces the formation of appreciable quantities of the chlorate.

Our present invention provides an improved process whereby the previously experienced difficulties are largely if not completely avoided. By our process we may prepare slurries of calcium hypochlorite at high concentration containing only very small amounts of chlorate. By reason of the permissible high concentration of the resulting hypochlorite slurries, solid, dry, stable calcium hypochlorite products of high test may be prepared with much less evaporation than is required by previously known methods. In addition to slurries and solid, dry products, hypochlorite solutions of high purity may be prepared where desirable.

In its broader aspect the invention comprises the neutralization of a hypochlorous acid solution with a basic calcium hypochlorite. As the basic hypochlorite constituent, either the dibasic or the hemibasic calcium hypochlorite may be used with advantage. Also mixtures of basic calcium hypochlorites may be employed.

According to a particularly advantageous embodiment of the invention the neutralization is carried out in the presence of neutral calcium hypochlorite by adding moist dibasic calcium hypochlorite crystals to a slurry of neutral calcium hypochlorite dihydrate, $Ca(OCl)_2.2H_2O$, while simultaneously adding hypochlorous acid solution. By this procedure we have found that slurries of the calcium hypochlorite may be prepared without the formation of basic salts. For instance the hemibasic calcium hypochlorite, which would be formed if the dibasic salt were added without the addition of the acid, is avoided, apparently by reason of the low content of dissolved lime. In order to prevent the formation of the chlorate, it is desirable to maintain some lime dissolved in the solution, but the amount is ordinarily less than that required to saturate the solution, so that conditions favoring the formation of hemibasic compounds do not exist. Moist crystals of the dibasic hypochlorite in the form of flat discs easily separate and become dispersed through the solution giving a uniform concentration of the alkaline salt throughout the reaction zone.

As an alternative procedure, we may add the moist dibasic crystals with stirring to a cold hypochlorous acid solution at a temperature of about minus 15° C. or lower, maintaining the resulting slurry at about this temperature until the added dibasic hypochlorite is uniformly dispersed and then pouring this cold slurry into a large volume of a slurry of neutral calcium hypochlorite dihydrate. Under these conditions, the slurry of the dibasic salt will remain acid until the dibasic salt has dissolved and reacted with the hypochlorous acid of the slurry. It is desirable to pour the cold slurry of dibasic hypochlorite and hypochlorous acid into the neutral slurry as soon as a thorough dispersion of the dibasic crystals in the acid has been accomplished in order to avoid possibility of the formation of chlorates. At about minus 15° C. such formation of chlorates is quite slow and adequate time for effecting dispersion of the dibasic crystals is permissible.

When operating in accordance with the last described aspect of our invention, the temperature of the neutral slurry may be maintained at about room temperature, say about 18–25° C. and advantageously at about 22° C. Under some conditions the addition of heat may be required depending largely upon the strength of the hypochlorous acid used.

In place of the dibasic calcium hypochlorite other basic calcium hypochlorites or mixtures thereof may be used in accordance with the general procedure just noted.

Basic calcium hypochlorites suitable for use in accordance with our invention may be prepared by methods known to the art. It is especially desirable to use crystals having a relatively large ratio of surface area to volume. We have found it particularly desirable to use crystals not exceeding several hundred microns in diameter with a thickness of 5–10% of the diameter. It is possible to produce large crystals of the dibasic hypochlorite in which the thickness may exceed the diameter. Such crystals are suitable for use in our present invention but, due to their low ratio of exposed surface to volume, their use is somewhat less advantageous than crystals of the type just described. It is also possible to use in our invention, though somewhat less advantageously, the small thin crystals obtained by casual chlorination of milk-of-lime slurry and having dimensions of 20–50 microns in diameter and 1–5 microns in thickness. However, such smaller crystals, when subjected to centrifuging, yield a cake containing as much as 25% or more of mother liquor as well as impurities originally present in the lime and for this reason crystals of this type are less desirable.

Crystals of several hundred microns in diameter having a thickness of 5–10% of the diameter may be centrifuged to obtain a cake containing 12–15% of mother liquor which may readily be largely washed from the cake. The washing serves to remove unreacted impurities originating in the lime, yielding a basic salt particularly desirable for our purpose.

It is desirable to avoid thick, very large dibasic crystals even though it is possible to centrifuge them to a cake containing only about 5% of water and a dibasic salt content of 99.5% or better on the dry basis. On the other hand it is advantageous to avoid the use of very fine crystals because of the high water content of the centrifuged cake as well as the inclusion of gritty material, such as chert or other rock derived from the lime, which may cause abrasion of equipment, such as spray drying equipment, used in subsequent processing.

Also, it is preferable to use a basic hypochlorite of a low calcium chloride content. Where the calcium chloride content is high, it may be reduced by washing the cake on the centrifuge. However, we find it unnecessary and even undesirable to continue the washing of the cake until the chloride content has been reduced to below about 0.5%, as such continued washing is likely to occasion the decomposition of the dibasic crystals and form a slime, seriously increasing the water content of the cake.

Another method found advantageous for reducing the chloride content of the crystal cake is to wash the cake using a solution containing about 8% of calcium hypochlorite obtained by making up a slurry of a portion of the dibasic crystals, separating all of the lime therefrom to form a clear solution and washing the major portion of the cake with this solution. In this way the chloride content of the crystal may be reduced to about 0.1%. However, in the final drying of calcium hypochlorite, there is a tendency for chlorides to form and for this reason it is not advantageous to reduce the chloride content of the basic hypochlorite crystals, used in our present process, to below about 0.5%.

An example of dibasic calcium hypochlorite which may be used with advantage in accordance with our invention, and which was prepared by centrifugally washing the cake, is shown by the following tabulation in which the analysis of the unwashed centrifuged cake is set forth in the first column, headed "Unwashed Cake," and the analysis of the cake after washing is set forth in the second column, headed "Washed Cake." In the washing of these crystals, ice water saturated with lime was used.

Table I

| Component | Unwashed Cake | Washed Cake |
| --- | --- | --- |
| Calcium hypochlorite | 41.8 | 42.0 |
| Calcium hydroxide | 41.4 | 43.5 |
| Calcium chloride | 1.8 | 0.4 |
| Water | 15.0 | 14.1 |
| | 100.0 | 100.0 |

As previously noted, it is desirable to use, as the basic hypochlorite, crystals which have been subjected to centrifuging for the separating of water therefrom and which are still wet and contain substantial proportions of water. However, it is possible to use crystals which have been more thoroughly dried, even though the subsequent drying may cause the plate-like crystals to adhere, forming granules or lumps. When dibasic calcium hypochlorite, for instance, is used in such dried form, the hypochlorous acid solution diffusing into the lumps dissolves relatively large amounts of calcium hydroxide and as a result the hemibasic salt may precipitate, binding the crystals in the lumps even more firmly and coating them with a layer of hemibasic crystals. Because of the density of the crystal clusters thus formed, reaction of the basic hypochlorite with the hypochlorous acid is retarded. Unless precautions are taken, slurries prepared from such dried dibasic salt may contain, after treatment with hypochlorous acid solution, considerable quantities of unreacted basic salts and are generally unsuitable for the preparation of high purity calcium hypochlorite.

Where such dried crystals are to be used in accordance with our invention, it is desirable that they first be ground to a fineness such that 99% or better will pass through a hundred mesh sieve. Even when this precaution is taken, the neutralization reaction is relatively slower than when fresh, moist basic crystals, such as centrifuge cakes, are used.

As the hypochlorous acid constituent of our process, acids of various strengths may be used, including weak solutions of about 10% hypochlorous acid or even less. However, where such weak acid solutions are used, there results an unsaturated solution of the neutral calcium hypochlorite. Therefore, where a slurry of the calcium hypochlorite is desired, a more concentrated solution of hypochlorous acid should be used. For instance, where it is desired to obtain slurries of a high calcium hypochlorite dihydrate content, hypochlorous acid solutions containing about 30–40% of hypochlorous acid should be used.

It will be understood that reference herein to hypochlorous acid or to a hypochlorous acid solution is not intended to include chlorine water. As generally recognized in the art, chlorine water does contain a small proportion, a fraction of 1%, of hypochlorous acid, but it also contains an equimolar proportion of hydrochloric acid. The terms "hypochlorous acid" and "hypochlorous acid solution" are used herein, in accordance with the customary usage of such terms in the art, to designate a solution consisting essentially of water and hypochlorous acid and substantially free from chloride.

Our invention will be further illustrated by the following examples of its application. In each instance, proportions are by weight.

Example I

Five parts of washed dibasic calcium hypochlorite crystals were rapidly mixed with 40 parts of hypochlorous acid containing 7.3% HOCl, and quickly poured into a vessel equipped with stirring arms and a heating jacket. The temperature of the mixture was adjusted to 22° C. and further portions of the dibasic salt and acid, in the proportions just indicated, were added at five minute intervals and rapidly mixed with the slurry. After seven such additions, while maintaining the temperature at 22° C. the solution in the vessel was found to contain the following:

|  | Per cent |
|---|---|
| $Ca(OCl)_2$ | 14.2 |
| $Ca(ClO_3)_2$ | 0.12 |
| $CaCl_2$ | 0.14 |
| $Ca(OH)_2$ | 0.2 |

For comparison, another portion of the 7.3% hypochlorous acid solution was neutralized with a 2:1 water-lime slurry in accordance with prior art methods and the resultant solution was found to contain only 8.5% $Ca(OCl)_2$.

Example II

A centrifuged and washed dibasic calcium hypochlorite was dried in a current of hot air to produce a material having the composition set forth in the first column of the following tabulation headed "Dibasic." This dibasic material was then ground to pass a hundred mesh screen. A slurry of calcium hypochlorite containing about 40% calcium hypochlorite was placed in a jacketed vessel and heated to 20° C. This vessel was equipped with a turbo mixer which drew a vortex about the shaft extending down about one-fifth the depth of the slurry. By regulating the speed of the stirrer, the vortex was adjusted to avoid drawing air into the slurry. The ground dibasic calcium hypochlorite, in an amount equivalent to 10 grams of the crystals per liter of the slurry, was first added to the slurry of neutral calcium hypochlorite in the vessel and thereafter further additions of the dibasic crystal were made at a rate equivalent to 1 gram per minute per liter of slurry, while adding 32% hypochlorous acid solution at the rate of 2.2 grams per minute per liter of slurry. The acid was added close to the vortex so that it was rapidly drawn down and mixed into the slurry and the dibasic crystals were sprinkled on the surface of the slurry so as to minimize lumping. The temperature of the mixture was maintained at 18–20° C. and slurry was withdrawn from time to time from the vessel to maintain the level of the slurry at the desired point in the vessel. The withdrawn slurry was found to have a composition set forth in the second column of the following tabulation headed "Slurry." The withdrawn slurry was filtered, using a vacuum filter, to obtain a cake of the composition set forth in the third column of the following tabulation, headed "Filter Cake" and the product thus obtained was then dried under a vacuum and was thereafter found to have the analysis set forth in the fourth column of the following tabulation, headed "Dry Product."

|  | Dibasic | Slurry | Filter Cake | Dry Product |
|---|---|---|---|---|
|  | Per cent | Per cent | Per cent | Per cent |
| Calcium hypochlorite | 46.2 | 40.9 | 55.31 | 88.1 |
| Calcium chlorate | 1.0 | .7 | .39 | 1.6 |
| Calcium chloride | 2.5 | 2.7 | 1.40 | 4.2 |
| Calcium hydroxide | 49.5 | .6 | 1.3 | 3.6 |
| Calcium carbonate | .5 | .2 | .6 | 1.2 |
| Water, etc. | .3 | 54.9 | 41.0 | 1.3 |
|  | 100.0 | 100.0 | 100.0 | 100.0 |

In the foregoing tabulation, it appears that the dry product was almost 90% calcium hypochlorite, i. e. $Ca(OCl)_2$.

Example III

Using a centrifuged, moist dibasic hypochlorite to neutralize a 10% hypochlorous acid solution, we have obtained a 17.6% calcium hypochlorite solution in which about one-third of the calcium hypochlorite content was derived from the added dibasic salt. Where a 10% hypochlorous acid solution was neutralized using lime paste, made from two parts water and one part lime, in accordance with previously known methods, the resulting solution of calcium hypochlorite was found to contain only 11.2% of calcium hypochlorite.

The calcium hypochlorite solution made in accordance with our present invention may, if desired, be used as such. However, because of its lower water content it may economically be filtered to obtain a clear solution and subjected to spray drying, or the like, for the recovery of the solid calcium hypochlorite therefrom. The hypochlorite product thus obtained is of improved quality.

Using stronger solutions of hypochlorous acid, for example, 30% hypochlorous acid solution, slurries containing 40% of calcium hypochlorite have been obtained by neutralizing the acid with moist dibasic hypochlorite crystals. By carrying on the neutralization in the presence of a slurry of neutral calcium hypochlorite, a resultant slurry may be obtained containing as high as 60% of calcium hypochlorite dihydrate in desirable crystalline and readily filterable form. By reason of their low water content, the slurries prepared in accordance with our present invention may be dried with less decomposition than would be obtained in the drying of slurries prepared by prior art processes. The product may be produced in the form of a cake or may be so treated as to produce a granular, dust-free product. The hypochlorite content of the filtrate, separated from the product, may be readily reconverted to dibasic calcium hypochlorite, by treatment with lime, and may be used in the neutralizing of further quantities of hypochlorous acid.

Although our invention has been particularly described and illustrated with reference to the neutralization of the hypochlorous acid with the dibasic hypochlorite, it will be understood that the invention is also applicable to the use of other basic calcium hypochlorites or mixtures thereof. For instance, hemibasic hypochlorite may be used in accordance with our invention to neutralize the hypochlorous acid. However, when hemibasic hypochlorite is used it is desirable that it be added to the acid solution in a loose form, as opposed to compact crystals or aggregates. Where the hemibasic hypochlorite is used, consideration should be given to the lower neutralization values of the hemibasic material in determining the proportions of the acid and alkaline materials to be used. It is usually advantageous to use an amount of basic hypochlorite slightly in excess of that required to neutralize the acid. Since it is sometimes more difficult to prepare and purify the hemibasic calcium hypochlorite than it is to prepare the dibasic salt, the use of the latter is usually found more desirable.

We claim:

1. A process for the preparation of neutral calcium hypochlorite which comprises reacting a basic calcium hypochlorite substantially free from uncombined lime with an aqueous hypochlorous acid solution substantially free from chloride ion.

2. A process for the preparation of neutral calcium hypochlorite which comprises reacting dibasic calcium hypochlorite substantially free from uncombined lime with an aqueous hypochlorous acid solution substantially free from chloride ion.

3. A process for the preparation of neutral calcium hypochlorite which comprises reacting a basic calcium hypochlorite substantially free from uncombined lime with an aqueous hypochlorous acid solution substantially free from chloride ion in the presence of an aqueous slurry of neutral calcium hypochlorite.

4. A process for the preparation of neutral calcium hypochlorite which comprises adding moist dibasic calcium hypochlorite substantially free from uncombined lime and an aqueous hypochlorous acid solution substantially free from chloride ion simultaneously to an aqueous slurry of neutral calcium hypochlorite.

5. A process for the preparation of neutral calcium hypochlorite which comprises suspending dibasic calcium hypochlorite substantially free from uncombined lime in a cold, aqueous solution of hypochlorous acid substantially free from chloride ion and immediately thereafter admixing the suspension with an aqueous slurry of neutral calcium hypochlorite maintained at about room temperature.

6. A process for the preparation of neutral calcium hypochlorite slurries which comprises reacting dibasic calcium hypochlorite substantially free from uncombined lime with an aqueous hypochlorous acid solution substantially free from chloride ion in the presence of insufficient water to dissolve the resultant neutral calcium hypochlorite.

7. A process for the preparation of neutral calcium hypochlorite solutions which comprises reacting a basic calcium hypochlorite substantially free from uncombined lime with an aqueous hypochlorous acid solution substantially free from chloride ion in the presence of sufficient water to dissolve the resultant neutral calcium hypochlorite.

8. A process for the preparation of neutral calcium hypochlorite which comprises adding simultaneously to an aqueous slurry of neutral calcium hypochlorite an aqueous hypochlorous acid solution substantially free from chloride ion and dibasic calcium hypochlorite substantially free from uncombined lime, the latter in an amount slightly in excess of that required to neutralize the hypochlorous acid, and separating undissolved neutral calcium hypochlorite.

EDWARD C. SOULE.
HOMER L. ROBSON.

REFERENCES CITED

The following references are of record in the file of this patent:

UNITED STATES PATENTS

| Number | Name | Date |
|---|---|---|
| 1,481,003 | Gegenheimer | Jan. 15, 1924 |
| 1,481,039 | Taylor et al. | Jan. 15, 1924 |
| 1,426,752 | MacMahon | Aug. 22, 1922 |
| 2,320,635 | Mericola et al. | June 1, 1943 |
| 1,937,230 | Kitchen | Nov. 28, 1933 |

FOREIGN PATENTS

| Number | Country | Date |
|---|---|---|
| 487,009 | Great Britain | June 14, 1938 |
| 266,181 | Great Britain | Feb. 27, 1927 |